United States Patent Office 3,123,628
Patented Mar. 3, 1964

3,123,628
MANUFACTURE OF ORGANIC ESTERS BY REACTING ALPHA-METALLO-ACETATE SALTS WITH HYDROCARBON HALIDES
Rex D. Closson, Northville, Mich., assignor to Ethyl Corporation, New York, N.Y., a corporation of Virginia
No Drawing. Filed Oct. 30, 1956, Ser. No. 619,134
1 Claim. (Cl. 260—410.9)

This invention is concerned with a process for the manufacture of organic esters, in particular, from organometallic compounds.

It has long been known that certain organometallics will react with organic halides to produce a hydrocarbon and a halide salt of the metal in question. A typical example of such a reaction is that between amyl chloride and amyl sodium to produce decane. However, no satisfactory method has been known for producing organic esters directly from the organometallic compounds. The organic esters are generally prepared by the reaction of an organic halide or sulfate with a salt of a carboxylic acid. For example, reacting ethyl chloride with sodium propionate, the ethyl ester of propionic acid is obtained. There is no method known, however, for reacting, for example, ethyl chloride with a metal salt of propionic acid to obtain the ethyl ester of an acid having at least two more carbon atoms than the propionic acid, i.e., pentanoic acid. Such a process would be of particular value to the industry in providing a method for producing higher molecular weight esters than heretofore obtained when reacting certain salts of organic acids with an alkyl halide. As a result of investigations in this field, a simple and economical process has been found which will accomplish this result.

Accordingly, it is an object of this invention to provide a new and novel process for the production of organic esters. A particular object is to provide a process for the production of these compounds from metallo substituted metallic salts of carboxylic acids. A specific object is to provide a process for the production of the benzyl ester of phenyl propionic acid from a metallo substituted metallic salt of an organic acid. Still further objects of this invention will be apparent from the description hereinafter.

These and other objects of this invention are accomplished by the reaction of a metallo substituted metallic salt of a carboxylic acid wherein the metallic elements are selected from the group consisting of alkali and alkaline earth metals with an organic monohalide having at least one hydrogen atom on the halogen substituted carbon atom. These metallo substituted metallic salts of a carboxylic acid are further described in applicant's copending application Serial No. 438,357, filed June 21, 1954, now U.S. Patent 2,850,528, granted September 2, 1958. The proportions of the reactants employed and the temperature of the reaction are important and must be maintained within certain ranges in order to achieve the desired results. In general, at least about 1.75 moles of the organic monohalide are employed per mole of the metallo substituted metallic salt of the carboxylic acid. In order to avoid excessive by-product formation and to achieve higher yields, it is preferred to employ between about 2 and 2.5 moles of the organic monohalide per mole of the metallo substituted metallic salt of the carboxylic acid. In this connection, when less than about two moles of the organic monohalide are employed, the yield of ester will be correspondingly reduced. Employing more than about 2½ moles of the organic monohalide serves no particular advantage other than as a reaction diluent. The reaction temperature employed is at least about 60° C. up to the decomposition temperature of the reactants. It is preferred, however, to employ a reaction temperature of at least about 100° C. but below the decomposition temperature of the reactants in order to achieve a faster reaction rate and high yields. Thus, the process of this invention provides a direct route to the organic esters from metallo substituted metallic salts of carboxylic acids. The ester can be readily separated from the by-product metal halide by conventional techniques.

The process provided herein will be more particularly understood from a consideration of the following examples. In these examples, all parts and percentages are by weight unless otherwise specified.

*Example I*

Alpha-sodio-sodium acetate was prepared by reacting 7.8 parts of finely divided sodium amide with 30 parts of anhydrous sodium acetate under a nitrogen atmosphere at a temperature between about 180–235° C. with continuous evolution and removal of ammonia and agitation. After cooling to room temperature, to the product thus obtained was added 83 parts of benzyl chloride. Thus, about 3.3 moles of the halide were employed per mole of the α-sodio-sodium acetate. This mixture was then heated to 60° C. Vigorous reaction took place which was completed within a few minutes, accompanied by a temperature rise. The reaction mass became nearly solid. The product upon cooling to room temperature was filtered and the solids washed with hexane. The filtrate was vacuum distilled to remove benzyl chloride which is reused and a fraction boiling at 240° C. at 14 mm. of mercury was collected. This fraction was redistilled at atmospheric pressure and a fraction boiling between 310–340° C. was analyzed and found to contain 81.6% carbon, 6.74% hydrogen, no nitrogen and less than 1% chlorine which compares with the benzyl ester of phenyl propionic acid which has 80.2% carbon and 6.7% hydrogen.

In order to determine that the expected sodium phenyl propionate was not produced, the solids were then dried, dissolved in water and acidified with hydrochloric acid. No precipitate formed. The acidified water solution was then extracted with ether and the ether extract evaporated. No phenyl propionic acid was recovered.

*Example II*

Example I is repeated essentially as described with the exception that octyl bromide, 38.6 parts, are reacted with 10.4 parts of α-sodio-sodium acetate in 150 parts of n-nonane as a diluent. Thus, 0.2 mole of the bromide is reacted with 0.1 mole of the α-sodio-sodium acetate. The mixture is externally heated to the reflux temperature, about 150° C., and maintained at this temperature for 6 hours. Upon recovery of the product, the octyl ester of decanoic acid is obtained in high yield.

When octyl iodide is substituted for octyl bromide in the above example, equally good results are obtained. Likewise, when substituting α-potassio-potassium acetate, α-lithio-lithium acetate, α-calcio-barium acetate, α-bariocerous acetate for α-sodio-sodium acetate in this example, the octyl ester of decanoic acid is obtained in high yield.

*Example III*

When 2½ moles of amyl bromide are reacted with 1 mole of α-sodio-sodium acetate employing xylene as a diluent at 120° C., the amyl ester of heptanoic acid is obtained in high yield.

*Example IV*

Reacting α-calcio-sodium acetate with benzyl chloride in a ratio of 1:2 moles respectively as described in Example I, the benzyl ester of phenyl propionic acid is obtained in high yield.

Example V

When α-sodio-sodium acetate is reacted with allyl chloride as described in Example I but at a temperature of 100° C. for about 1 hour in a molar proportion of 1:2 respectively, the allyl ester of 4-pentene-1-oic acid is obtained in high yield.

Example VI

By reacting 160 parts of α-sodio-sodium caproate with 253 parts of benzyl chloride at 100° C. as in Example I, the benzyl ester of β-butyl phenyl propionic acid is obtained.

Example VII

The benzyl ester of β-phenyl phenyl propionic acid is obtained in high yield when 180 parts of α-sodio-sodium phenyl acetate is reacted with 253 parts of benzyl chloride in 400 parts of toluene under reflux conditions.

The above examples are presented by way of illustration and it is to be understood that they do not in any way limit the present invention.

As mentioned previously, the organic monohalide is one which has at least one hydrogen atom on the halogen-substituted carbon atom. Typical examples of organic halides which are included in this definition are the haloethers and thioethers such as di-(chloromethyl) ether of ethylene glycol, di-(chloromethyl) thioether of ethylene glycol and the like: halogen substituted tertiary amines such as 4-chloro-N,N-diethyl butyl amine; and the hydrocarbon halides. The hydrocarbon halides selected from the group consisting of alkyl (including cycloalkyl), alkenyl (including cycloalkenyl), aralkyl and aralkenyl monohalides having at least one hydrogen atom on the halogen substituted carbon atom are particularly preferred because of greater reactivity. Of these halides, those which are not readily susceptible to dehydrohalogenation are especially suitable. Typical, but not limiting examples of these preferred organic halides include benzyl chloride, n-butyl bromide, allyl chloride, octyl bromide, hexenyl chloride, β-cyclohexyl-ethyl bromide, octenyl chloride and the like hydrocarbon monochlorides having up to about 18 carbon atoms and similar such compounds in which the halide is chlorine, bromine, iodine or fluorine. The iodides and bromides are especially preferred since they are less susceptible to dehydrohalogenation. Many other examples will be evident to those skilled in the art. Thus, in any of the examples presented above, hexenyl chloride, n-butyl bromide, allyl chloride and the like can be substituted for the organic monohalide employed in the reaction to produce similar results.

The metallo substituted metallic salts of carboxylic acids are those in which the metallic elements are selected from the group consisting of alkali and alkaline earth metal. These compounds can be depicted by the following illustrative formula:

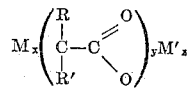

wherein M and M' can be the same or different and are selected from the alkali and alkaline earth metals, $x$, $y$ and $z$ are small whole numbers which can be the same or different and are dependent upon the valence of the metallic elements M and M' and R and R' can be the same or different and are selected from the group consisting of hydrogen and organic radicals. The alkali metals are intended to include all the metals of group I of the periodic table. The alkaline earth metals include all the elements of group II of the periodic chart of the elements as set forth in the Handbook of Chemistry and Physics, 35th ed., Chemical Rubber Publishing Co., at page 392.

As described, R and R' can be the same or different and are selected from the group consisting of hydrogen and organic radicals. The organic radicals particularly preferred are the monovalent organic radicals. The term "monovalent organic radical" denotes a univalent, aliphatic, alicyclic, or aromatic radical which can be further substituted. By the term "univalent aliphatic" is intended a univalent radical derived from an open chain saturated or unsaturated carbon compound. The term "univalent alicyclic radical" denotes a univalent radical derived from the corresponding aliphatic compounds by ring formation.

Thus, when the substituents, R and R' are univalent, aliphatic radicals, they can be radicals such as the alkyl radicals methyl, ethyl, isopropyl, n-butyl, isobutyl tert butyl, n-amyl, and various positional isomers such as, for example, 2-methylbutyl; 1,2-dimethylpropyl; and 1-ethylpropyl, and likewise, the corresponding straight or branched chain isomers of hexyl, heptyl, octyl, and the like up to and including about eicosyl. Moreover, such monovalent aliphatic radicals can be alkenyl radicals such as, for example, ethenyl, $\Delta^2$-propenyl, isopropenyl, $\Delta^2$-butenyl, $\Delta^3$-butenyl, and the corresponding branched chain isomers thereof, and other alkenyl radicals such as hexenyl, heptenyl, octenyl, up to and including eicosenyl, and their corresponding branched chain isomers. Further, such monovalent hydrocarbon substituents can be aralkyl radicals such as, for example, benzyl, α-phenylethyl, β-phenylpropyl, γ-phenylpropyl, β-phenylisopropyl, α-phenylbutyl, γ-phenylbutyl, and the like, and α'-naphthylmethyl, α-(α'-naphthyl)-ethyl, α-(β'-naphthyl-ethyl), and the like, and their corresponding positional isomers. Moreover, the univalent aliphatic radical or radicals can be aralkenyl radicals such as, for example, α-phenyl ethenyl, α-phenyl-$\Delta^2$-propenyl, β-phenyl-$\Delta^2$-propenyl, α-phenyl-$\Delta^2$-propenyl, α-phenylisopropenyl, β-phenylisopropenyl, and similarly, the phenyl derivatives of the isomers of butenyl, pentenyl, and the like. Other such aryl alkenyls include α-(β'-naphthyl)-ethenyl, β-(α'-naphthyl)-ethenyl, α-(β'-naphthyl)-$\Delta^2$-propenyl, β-(β'-naphthyl)-$\Delta^2$-propenyl, α-(β'-naphthyl)-$\Delta^2$-propenyl, α-(α'-naphthyl)-isopropenyl, and the like.

When the monovalent hydrocarbon radical is a univalent alicyclic radical or radicals, these can be selected from the group consisting of cycloalkyl and cycloalkenyl radicals. Thus, for example, they can be the cycloalkyl radicals, cyclopropyl, cyclobutyl, cycloamyl, cyclohexyl, and the like, and such cycloaliphatic radicals as α-cyclopropylethyl, β-cyclobutylpropyl, and the like. Similarly, the alicyclic radicals can be cycloalkenyl radicals such as, for example, α-cyclohexyl ethenyl, α-cycloheptyl-$\Delta^2$-propenyl, β-cyclooctyl-$\Delta^2$-propenyl, β-cyclononyl isopropenyl, and the like. When the monovalent hydrocarbon radical is a univalent aromatic radical or radicals, these can be selected from the group consisting of aryl and alkaryl radicals; for example, aryl radicals such as phenyl, α-naphthyl, β-anthryl, and the like. Moreover, the univalent aromatic radical can be alkaryl radicals such as, for example o-tolyl; 2,3-xylyl; 2,4-xylyl; 2,6-xylyl; and the like, or o-ethylphenyl, p-ethylphenyl, 2-methyl-α-naphthyl, 4-methyl-α-naphthyl, 7-methyl-α-naphthyl, and the like.

It is to be understood that the foregoing examples of the radicals R and R' are presented as illustrations and other examples will be evident. Further, these radicals can be substituted with other constituents provided such are inert to the reactants as, for example, ether linkages.

Among the compounds thus defined are included α-lithio-sodium acetate, α-sodio-potassium acetate, α-bariobarium acetate, α-calcio-magnesium acetate, α-magnesiomagnesium actate, α-sodio-calcium acetate, α-sodio-sodium propionate, α-sodio-potassium-4-methyl-caproate, α-potassio-sodium vinyl acetate, α-sodio-lithium phenyl acetate, α-lithio-lithium isobutyrate, and the like. The metallo substituted metallic salts of the carboxylic acids containing only 2 carbon atoms are particularly preferred because of their greater reactivity, stability, and availability. Additionally, the alkali metals, particularly sodium, are especially preferred due to greater availability. However, it is to be understood that any of the aforementioned metallo substituted metallic salts of the carboxylic acids and others can be substituted for the corresponding compounds employed in the Examples I–VII above to produce good results.

As stated hereinbefore, the reaction tempearture is generally above 60° C., but below the decomposition temperature of the reactants. Accordingly, similar results are obtained in the Examples I through VII when employing temperatures of 60, 80, 100, 130, 160 and 180° C. in place of the temperature employed in these particular examples. In order to obtain faster reaction rates, temperatures above about 100° C. are preferred. Generally, atmospheric pressure is utilized and other pressures have no particular effect upon the reaction. Subatmospheric and superatmospheric pressures can, however, be employed.

It has been found that the time of the reaction is not critical. In some instances the reaction is essentially instantaneous whereas in other instances longer reaction periods are required, for example, when employing the normal alkyl monohalides. In general, reaction times of between ½ minute to 10 hours are employed. Ordinarily, however, periods longer than 6 hours are not required in order to effect completion of the reaction.

In order to avoid side effects and decomposition of the metallo substituted metallic salt of the carboxylic acid, it is preferable that the reactants be in essentially anhydrous condition. In this connection, although not absolutely essential, an inert atmosphere can be employed during the course of the reaction. Typical examples of such inert atmospheres are the gases nitrogen, neon, argon, krypton and the like, or a dry atmosphere.

As indicated in the examples, diluents are generally employed when performing this invention. Such diluents ordinarily are not required when the organic monohalide is a liquid although for more efficient agitation and contact of the reactants, diluents are generally employed. In general, the criteria of choice of such diluents are that they be liquid under the reaction conditions and substantially inert to the reactants. The hydrocarbons, organic monohalides, and ethers are particularly suitable for this purpose. Typical examples of such solvents are the pentanes, octanes and the like and including those alkyl, alkenyl, cycloalkyl and cycloalkenyl hydrocarbons containing up to about 18 carbon atoms, benzene, toluene, heavy alkylates, mineral oil and the like hydrocarbons and mixtures thereof. Among the ethers are included the alkyl ethers such as diamyl ether, butyl amyl ether, the polyethers including, for example, the dimethyl, diethyl and the like ethers of ethylene glycol, diethylene glycol and the like, and dioxane. The organic monohalide diluents employed are those reactants described previously which are liquid at reaction temperature but in excess quantity. Still other diluents will be evident to those skilled in the art. It is preferable, where the organic monohalide is a liquid to use an excess thereof as the diluent to provide a more polar solvent system as well as limit the number of diluents to be removed when the product is recovered.

The esters produced according to this invention can be employed directly as produced in the reaction without further purificaiton other than separation of the metal salt by-product. However, for more varied usage, it is generally recovered from the reaction mixture in the following manner. The reaction mixture is subjected to mechanical separation techniques, e.g., filtration or decantation to remove the metal halide. The liquid phase is then fractionated to recover the product ester at appropriate temperature and pressure conditions depending upon the ester involved.

The products produced by the process of this invention are of widespread utility. For example, these esters can be reduced with an alkali metal in the presence of a reducing alcohol according to the Bouveault-Blanc process to produce the corresponding alcohols of the acid and ester functions. Likewise, they can be subjected to conventional ester interchange techniques to produce a different ester of the corresponding acid. Additionally, a number of the esters produced are of considerable value as solvents. For example, they are employed as extracting solvents to extract dibasic acids from water solutions. An illustration of such is the employment of the ethyl ester of butyric acid for extracting malonic acid from its solution in water.

I claim:

A direct process for preparing esters of carboxylic acids in which esters the alcohol moiety radical linked to the carboxyl group is a hydrocarbon radical selected from the class consisting of aliphatic and araliphatic radicals having up to 18 carbon atoms, the hydrocarbon radical has at least one hydrogen atom on its linking carbon atom, and the acid portion of the ester has a terminal radical identical with said hydrocarbon radical and connected to the carboxyl group by a methylene bridge, said process consisting essentially of reacting an alpha-metallometallic acetate in which both metal moieties are alkali metals, with the halide of the hydrocarbon radical at a temperature of at least 60° C., under anhydrous conditions and in the proportion of about 1.75 to 3.3 moles of the halide for every mole of the acetate to cause both alkali metal moieties to be replaced by the above hydrocarbon radicals in one operation, and the reaction temperature being below the decomposition temperature of the reactants.

References Cited in the file of this patent
UNITED STATES PATENTS 2,850,528    Closson ---------------- Sept. 2, 1958

OTHER REFERENCES

Sesemann: Ber., 6, 1085–7 (1873).
Merz et al.: Ber., 10, 758 (1877).
Gomberg et al.: J. Am. Chem. Soc., 42, 2063–2065 (1920).
Beilstein, 9, 509, 511 (1926).
Hammett: Physical Organic Chemistry, pp. 154–5, McGraw-Hill, 1940.